United States Patent Office.

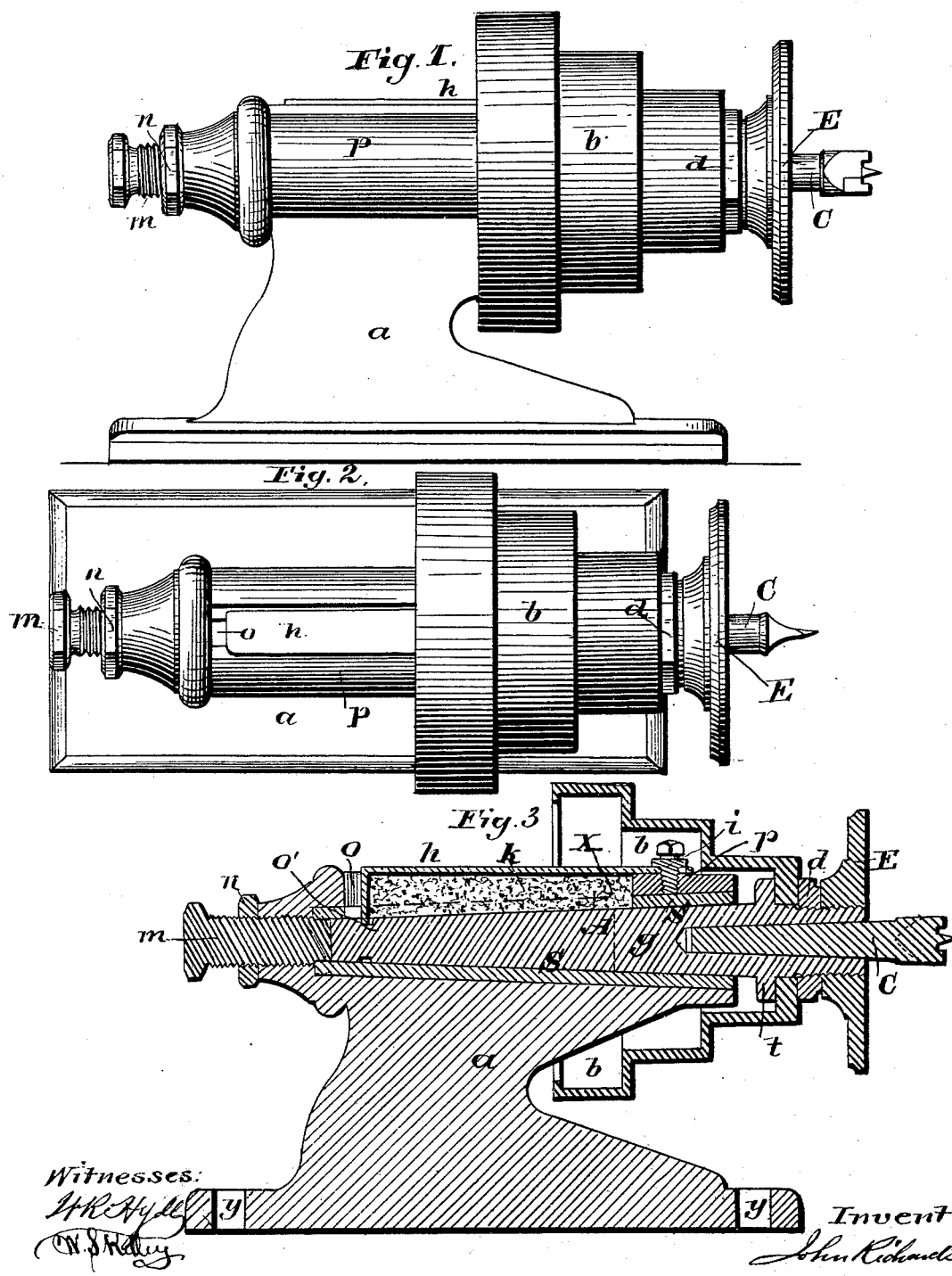

JOHN RICHARDS, OF CINCINNATI, OHIO, ASSIGNOR TO J. A. FAY & CO., OF SAME PLACE.

*Letters Patent No. 67,676, dated August 13, 1867.*

---

IMPROVEMENT IN TURNING-LATHES.

---

The Schedule referred to in these Letters Patent and making part of the same.

---

TO ALL WHOM IT MAY CONCERN:

Be it known that I, JOHN RICHARDS, of Cincinnati, in the county of Hamilton, and State of Ohio, have invented certain Improvements in Turning-Lathes; and I do hereby declare the following to be a full and exact description of the same, reference being had to the accompanying drawings, forming a part of this specification, in which—

Figure 1 is a side elevation of a lathe-head constructed with my improvements.

Figure 2 is a top view of the same, and

Figure 3 a longitudinal section, showing the spindle and manner of fitting the same.

Similar letters of reference on the different figures indicate corresponding parts.

The nature of this invention consists in constructing a lathe with one long continuous bearing for the spindle, with cones or driving-pulleys overhanging the same, so that the strain of the belt may fall directly upon the bearing, and in attaching the driving-pulleys to the front end of the spindle and outside the bearings, and in forming a spindle with a differential taper, for purposes hereinafter explained; also, in the device for retaining and adjusting the spindle; the whole forming an important improvement in turning-lathes, while lessening the cost and simplifying their construction, as will be hereafter explained.

In turning-lathes constructed in the usual manner with two independent bearings for the spindle, and when the end-thrust is taken up in the back bearing, any great pressure falling in the line of the spindle forces the bearings apart and out of line, causing them to heat, and preventing them from being run as tight as they might otherwise operate, there also being two adjustments for bearings and one for end motion. The spindles cannot be so readily kept steady and firm as in the lathe illustrated.

To enable others skilled in the art to make and use my invention, I will proceed to describe the manner of constructing and operating the same with the aid of the drawings.

The frame for the lathe-head A is cast in a single piece, with a flanged base to fasten down in the usual manner, and with the hollow sleeve $p$ to receive the spindle $g$. Through the top of this hollow sleeve or shell is cored a slot extending about two-thirds the length of the bearing from $o$ to $x$, fig. 3. The main bore of the sleeve is also made large enough to receive the lining of soft metal S, the back end being cast solid and drilled to receive the screw $m$. Holes $y\ y$ are cored to receive bolts to fasten the head down. The spindle $g$ is turned with a differential taper on its exterior, as shown in fig. 3, the greatest taper being from the line A forward, while the back end of the spindle from that point has less taper in proportion to its diameter and the conditions of its operations. The taper on the spindle provides a means of tightening by moving it farther into the socket or bearing, while the different degrees of taper compensate for the wear at different points in proportion to the diameter and velocity of the surfaces. The strain from the side-thrust on the work also falls mainly on the front end of the spindle, making it necessary that the compensation for wear should be at least twice as great as at the back end. The spindle can also be turned with a parabolic curve on its exterior instead of two straight lines, which comes nearer meeting the scientific conditions of its wear. The spindle is provided with a collar, $t$, against which the cone-pulley $b$ is pressed and firmly held by nut $d$, the threaded extension being long enough to receive a face-plate, E. The spindle is bored out in the usual manner to receive the centre C, and is retained in place by means of the spring $h$, which has an angular extension passing down into a groove formed in the spindle at $o'$, fig. 3; this retains the spindle in its place, and keeps it at all times in contact with the pressure-screw $m$. This spring-catch $h$ is slotted at the bolt $i$, to give it sufficient end movement to tighten the spindle, which is accomplished by loosing the screw $m$ and moving the spindle farther into the socket. To remove the spindle, the spring-catch is raised to disengage it at $o'$, when the spindle is easily drawn out and replaced. The slot under the spring $h$ is filled with cotton-waste or other material at $k$, to retain the oil and insure a perfect lubrication of the spindle, the spring forming a cover to keep out the dust. In filling the shell with soft metal the spindle is allowed to project, as shown in fig. 3, to allow for wear and adjustment by moving the spindle $g$ into the socket, as before explained. The shell can also be filled anew at any time, making the lathe easy to repair and keep line. The space $o$ is left for an oil-way, the oil coming first in contact with the end of the spindle and working out through the bearing into the pulley $b$, which prevents it from flying on the operator. The pulley *b* is fastened by means of a screw-nut and flange-collar to the front end of the spindle and outside the spindle-bearings, and not between two bearings or behind a single bearing, as in lathes hitherto constructed. This has important advantages in a lathe having a continuous or single bearing, as it allows the back end of the spindle to work against a back-pressure screw or pivot *m*, whereas if the cones were attached behind the bearing the thrust of the spindle would have to fall on a collar in front or on the taper bearings, causing the spindle to heat and wear rapidly.

Having thus described the nature of my invention, its mode of construction, and manner of operating, what I claim as new, and desire to secure by Letters Patent, is—

The combination of the taper spindle $g'$, the adjusting-screw *m*, and the spring-catch *h*, or equivalent mechanism for retaining the spindle in the socket, all operating in the manner and for the purposes specified.

JOHN RICHARDS.

Witnesses:
WM. S. KELLEY.
W. C. HARD.